United States Patent
Rhelimi

(10) Patent No.: US 10,693,842 B2
(45) Date of Patent: Jun. 23, 2020

(54) DEVICE FOR MANAGING MULTIPLE ACCESSES TO A SECURE MODULE OF A SYSTEM ON CHIP OF AN APPARATUS

(71) Applicant: GEMALTO SA, Meudon (FR)

(72) Inventor: Alain Rhelimi, Meudon (FR)

(73) Assignee: Thales Dis France SA, Meudon (FR)

( * ) Notice: Subject to any disclaimer, the term of this patent is extended or adjusted under 35 U.S.C. 154(b) by 189 days.

(21) Appl. No.: 15/567,346

(22) PCT Filed: Apr. 13, 2016

(86) PCT No.: PCT/EP2016/058076
§ 371 (c)(1),
(2) Date: Oct. 17, 2017

(87) PCT Pub. No.: WO2016/166134
PCT Pub. Date: Oct. 20, 2016

(65) Prior Publication Data
US 2018/0097781 A1    Apr. 5, 2018

(30) Foreign Application Priority Data
Apr. 17, 2015 (EP) ..................... 15305586

(51) Int. Cl.
*G06F 12/14* (2006.01)
*H04L 9/00* (2006.01)
(Continued)

(52) U.S. Cl.
CPC ........ *H04L 63/0428* (2013.01); *G06F 12/145* (2013.01); *G06F 12/1408* (2013.01);
(Continued)

(58) Field of Classification Search
CPC ............. H04L 63/0428; G06F 12/1408; G06F 12/145; G06F 21/74; G06F 21/79; G06F 21/85
(Continued)

(56) References Cited

U.S. PATENT DOCUMENTS 6,857,076 B1    2/2005 Klein
8,332,931 B1    12/2012 Tran et al.
(Continued)

FOREIGN PATENT DOCUMENTS

EP          2725517 A1    4/2014
WO    WO2007071755 A1    6/2007

OTHER PUBLICATIONS

PCT/EP2016/058076, International Search Report, dated Jun. 22, 2016, European Patent Office, P.B. 5818 Patentlaan 2 NL—2280 HV Rijswijk.
(Continued)

*Primary Examiner* — Haresh N Patel
(74) *Attorney, Agent, or Firm* — The Jansson Firm; Pehr B. Jansson

(57) ABSTRACT

A device for managing multiple accesses to a secure module of a system on chip of an apparatus, and comprises a stream ciphering means arranged for computing on the fly and in a single pass an integrity check for data to be transferred between secure and non secure modules of the system on chip with a seed and an encryption key, and for encrypting/decrypting on the fly and in this single pass these data with the encryption key, and a control means for providing the encryption key and seed to the stream ciphering means and for requesting data transfer and retrieving status to the secure and non secure modules for allowing the transfer of encrypted/decrypted data between the secure and non secure modules.

18 Claims, 1 Drawing Sheet

(51) Int. Cl.
*H04L 9/08* (2006.01)
*H04L 29/06* (2006.01)
*G06F 21/79* (2013.01)
*G09C 1/00* (2006.01)
*H04L 9/06* (2006.01)
*G06F 21/74* (2013.01)
*G06F 21/85* (2013.01)

(52) U.S. Cl.
CPC .............. *G06F 21/74* (2013.01); *G06F 21/79* (2013.01); *G06F 21/85* (2013.01); *G09C 1/00* (2013.01); *H04L 9/065* (2013.01); *G06F 2221/2125* (2013.01); *H04L 2209/12* (2013.01)

(58) Field of Classification Search
USPC .......................................................... 713/193
See application file for complete search history.

(56) References Cited

U.S. PATENT DOCUMENTS

| | | | | |
|---|---|---|---|---|
| 2004/0006703 | A1* | 1/2004 | Kitani | G06F 11/1004 713/193 |
| 2004/0165722 | A1* | 8/2004 | Van Rijnsoever | H04L 9/12 380/43 |
| 2006/0126841 | A1* | 6/2006 | Pal | H04L 63/04 380/255 |
| 2007/0244951 | A1* | 10/2007 | Gressel | G06F 7/582 708/252 |
| 2007/0255941 | A1* | 11/2007 | Ellis | H04L 9/0662 713/151 |
| 2008/0120676 | A1* | 5/2008 | Morad | H04N 21/42607 725/127 |
| 2010/0299517 | A1* | 11/2010 | Jukic | H04L 12/2809 713/150 |
| 2012/0189118 | A1* | 7/2012 | Beck | H04L 9/0662 380/42 |
| 2013/0138975 | A1 | 5/2013 | Martinez et al. | |
| 2013/0263114 | A1* | 10/2013 | Watkins | G06F 9/45558 718/1 |
| 2014/0074719 | A1* | 3/2014 | Gressel | G06Q 20/3827 705/64 |
| 2014/0079215 | A1* | 3/2014 | Wei | H04L 9/0668 380/46 |
| 2014/0192974 | A1* | 7/2014 | Hamilton | G06F 21/72 380/42 |
| 2015/0089223 | A1* | 3/2015 | Tasher | G06F 21/85 713/168 |
| 2015/0263852 | A1* | 9/2015 | Alon | G09C 1/00 380/28 |
| 2015/0358300 | A1* | 12/2015 | Urzi | H04L 63/0464 713/190 |
| 2017/0338946 | A1* | 11/2017 | Naslund | H04L 9/0631 |

OTHER PUBLICATIONS

PCT/EP20161058076, Written Opinion of the International Searching Authority, dated Jun. 22, 2016, European Patent Office, D-80298 Munich.

* cited by examiner

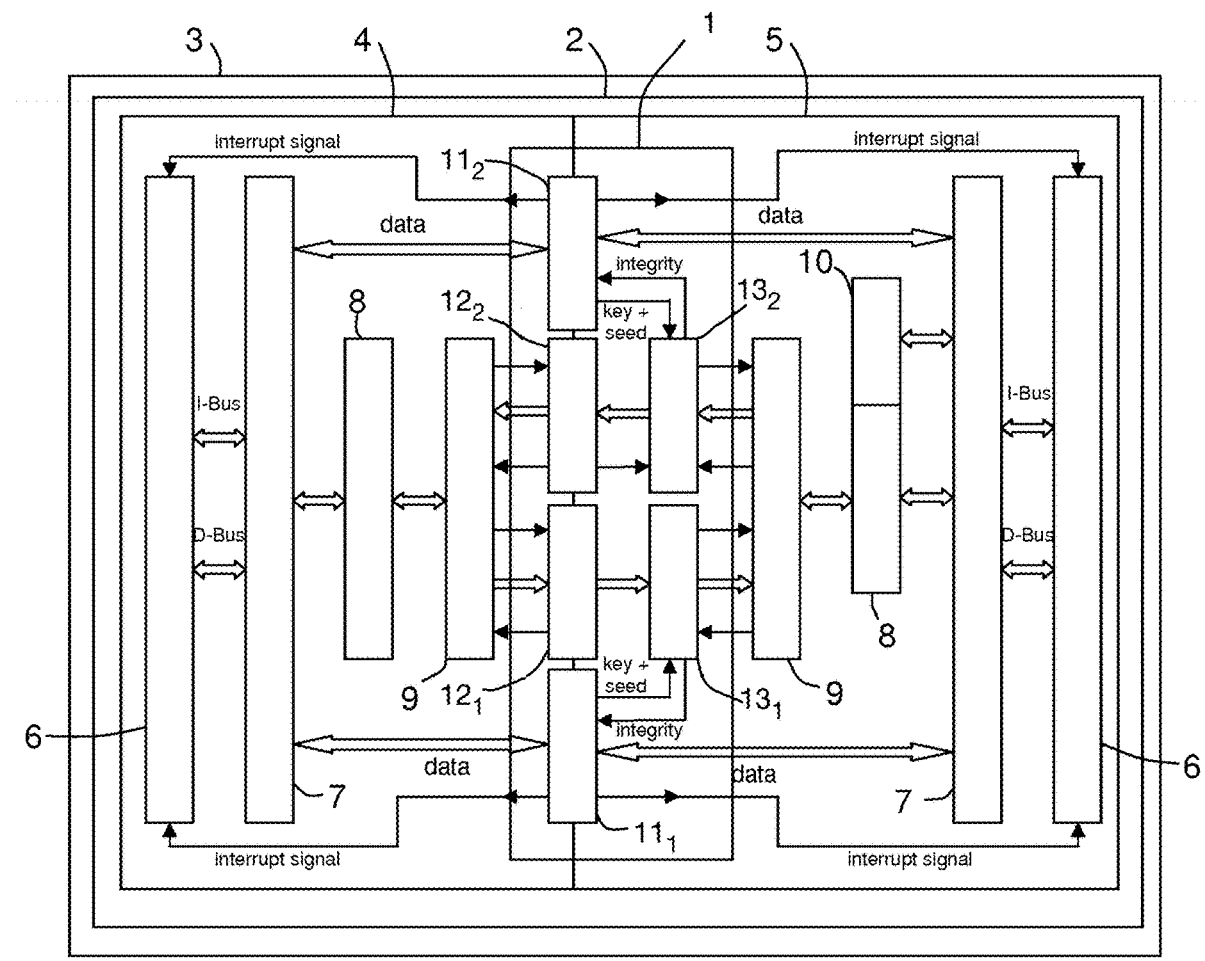

DEVICE FOR MANAGING MULTIPLE ACCESSES TO A SECURE MODULE OF A SYSTEM ON CHIP OF AN APPARATUS

TECHNICAL FIELD

The present invention relates to synthesizable secure elements (or modules) comprised into hardware hosts and acting as several virtual secure elements for several image owners, and more precisely the way to manage multiple accesses to such secure elements (or modules) to share efficiently their hardware hosts.

BACKGROUND OF THE INVENTION

A secure element (embedded or removable) is usually hosting a single Operating System (or OS) offering access to generic and specific services customized according to requirements from at least one image owner. So, it may be a SIM (or UICC) card or a smart card or a chip card or else an integrated circuit card, for instance.

In the following description it will be considered that an image owner is a commercial entity that has purchased an image from an image maker, an image maker is an entity that has built an image, and an image is a structured and encrypted representation of binary information stored in the memory of a secure element and embedding means for decrypting encapsulated data, managing rights and checking integrity of loaded decrypted data.

As known by the man skilled in the art, on top of the operating system of a secure element one may define memory domains containing applications and supported by the OS services.

In order an OS of a secure element supports a single image of an image owner, it has only to support a single set of requirements defined by (or for) this image owner. But, when a secure element of a hardware host must act as several virtual secure elements for several image owners, its OS may be incapable of supporting all the requirements of the sets defined by (or for) these image owners.

SUMMARY OF THE INVENTION

So, an objective of the invention is to improve the situation, and more precisely to allow sharing of a secure hardware environment of a hardware host comprising a secure module (or element) acting as several virtual secure elements for several image owners.

To this effect the invention provides notably a device, intended for managing multiple accesses to a secure module of a system on chip (or SoC) of an apparatus, and comprising:

- a stream ciphering means arranged for computing on the fly and in a single pass an integrity check an integrity check for data to be transferred between secure and non secure modules of the system on chip with a seed and an encryption key, and for encrypting/decrypting on the fly and in this single pass these data with this encryption key, and
- a control means for providing these encryption key and seed to the stream ciphering means and for requesting data transfer and retrieving status to said secure and non secure modules for allowing the transfer of encrypted/decrypted data between the secure and non secure modules.

The device according to the invention may include additional characteristics considered separately or combined, and notably:

- it may further comprise a first memory means for storing temporary chunks of encrypted data during their transfer from the stream ciphering means to the non secure module of the system on chip, and a second memory means for storing temporary chunks of data during their transfer from the secure module of the system on chip to the stream ciphering means;
- its control means may be arranged for providing the computed integrity check to the secure module of the system on chip;
- its control means may be arranged for providing a channel information, defining a routing of the transferred data to a given function, to the secure module and the non secure module of the system on chip;
- its stream ciphering means may comprise a first part arranged for computing on the fly and in a single pass an integrity check for data to be transferred from the non secure module to the secure module of the system on chip, and for decrypting on the fly and in this single pass encrypted data to be transferred to the secure module, and a second part arranged for computing on the fly and in a single pass an integrity check for data to be transferred from the secure module to the non secure module of the system on chip, and for encrypting these data on the fly and in this single pass before transferring them to the non secure module of the system on chip;
- its control means may comprise a first part arranged for providing the encryption key and seed to the stream ciphering means and for requesting data transfer and retrieving status to the non secure module for allowing the transfer of encrypted data from the non secure module to the stream ciphering means and then the transfer of decrypted data from the stream ciphering means to the secure module, and a second part arranged for providing the encryption key and seed to the stream ciphering means and for requesting data transfer and retrieving status to the secure module for allowing the transfer of data from the secure module to the stream ciphering means and then the transfer of encrypted data from the stream ciphering means to the non secure module.

The invention also provides a system on chip (or SoC) intended for equipping an apparatus and comprising secure and non secure modules, and a device such as the one above introduced and interfacing data transfer between the secure and non secure modules.

The invention also provides an apparatus comprising at least one system on chip (or SoC) such as the one above introduced.

For instance, this apparatus may define any component or equipment having a fast access to fast non volatile memory (or NVM).

BRIEF DESCRIPTION OF THE FIGURES

Other features and advantages of the invention will become apparent on examining the detailed specifications hereafter and the appended drawing, wherein the unique FIGURE schematically and functionally illustrates an example of apparatus comprising an example of embodiment of a system on chip comprising an example of embodiment of a device according to the invention.

DETAILED DESCRIPTION OF THE PREFERRED EMBODIMENT

The appended drawing may serve not only to complete the invention, but also to contribute to its definition, if need be.

The invention aims, notably, at offering a device 1 intended for equipping a system on chip (or SoC) 2 of an apparatus 3, in order to manage multiple accesses to a secure module 5 of this system on chip 2 by several image owners.

In the following description it will be considered, as an example, that the apparatus 3 is a personal computer. But the invention is not limited to this type of apparatus. It concerns any OEM ("Original Equipment Manufacturer") device comprising at least one system on chip (or SoC) comprising a secure module (or element), and notably a smart phones, electronic tablets, smart watches, laptops, and game consoles.

Moreover, in the following description it will be considered, as an example, that the system on chip 2 is an application processor. But the invention is not limited to this type of SoC. Indeed, it concerns any SoC having a fast access to fast non volatile memory (or NVM), and notably ASICs, FPGAs and microcontrollers.

In the example illustrated in the unique FIGURE, the apparatus 3 comprises a system on chip 2 containing a non secure module 4, a secure module 5, and a device 1 interfacing data transfer between these non secure 4 and secure 5 modules.

The non secure module 4 offers at least one function. For instance it allows communication equipments to exchange data with the apparatus 3. Moreover, the non secure module 4 stores a group of images belonging to different image owners and associated respectively to different sets of requirements. It is recalled that an image is a structured and encrypted representation of binary information stored in a memory of the system on chip 2 and embedding means for decrypting encapsulated data, managing rights and checking integrity of loaded decrypted data.

The non secure 4 and secure 5 modules may operate on different clock domains and power domains.

In the non-limiting example illustrated in the unique FIGURE, the non secure module 4 and the secure module 5 each comprise notably a central processing unit (or CPU) 6, a memory management unit (or MMU) 7, a random access memory (or RAM) 8, and a direct memory access (or DMA) element 9. The secure module 5 comprises further a One Time Programmable (or OTP) element 10 based on a technology such as Logic NVM ("Non Volatile Memory") able to be synthesized, for instance, by a standard digital silicon technology.

For instance, the CPU 6 is coupled to the MMU 7 by means of two buses I-Bus and D-Bus, the MMU 7 is further coupled to the RAM 8 by means of a bus, and the RAM 8 is further coupled to the DMA 9 by means of a bus. The OTP element 10 is coupled to the associated MMU 7 by means of a bus.

Each MMU 7 is in charge of translating a physical address of its associated RAM 8 in a virtual address and to check the permission rights associated to virtual address ranges. For instance, the RAM (or physical memory) 8 is fragmented in multiple logical areas named pages. So, in this case the MMU 8 manages a set of structures named TLB ("Translation Lookaside Buffer").

A TLB is a cache that memory management hardware uses to improve virtual address translation speed. A TLB is sometimes implemented as a content-addressable memory (CAM). A CAM search key is a virtual address and the search result is a physical address. If a requested address is present in a TLB, the CAM search yields a match quickly and the retrieved physical address can be used to access memory. This is called a TLB hit. If a requested address is not in a TLB, this is a miss, and a MMU page exception is generated. This exception may generate the backup of the last recently used physical page if the latter has been previously loaded. This backup is encrypted and transferred from the secure module 5 to the non secure module 4 by programming the device 1 (and more precisely its control means $11_2$, memory means $12_2$ and stream ciphering means $13_2$ described below). The non secure module 4 will backup the chunk of data in a non volatile memory (for instance a FLASH memory). The non secure module 4 transfers the encrypted physical page to the secure module 5 by using two DMAs 9, the device 1 (and more precisely its control means $11_1$, memory means $12_1$ and stream ciphering means $13_1$ described below), and then updates the concerned TLB.

The concerned CPU 6 resumes the MMU exception and continues the execution of its program located at the virtual address of the previous missing memory. If the physical page has not been previously loaded then its backup is useless. Then the concerned MMU 7 acts as a memory protection unit (or MPU), and therefore each virtual address range has its permission rights for checking the memory accesses.

As illustrated in the unique FIGURE, a device 1, according to the invention, comprises at least a control means $11_j$ and a stream ciphering means $13_j$, with j=1 or 2.

The stream ciphering means $13_j$ is arranged for computing on the fly and in a single pass an integrity check for data to be transferred between the secure 5 and non secure 4 modules of the associated system on chip 2, with a seed and an encryption key, and for encrypting/decrypting on the fly and in this single pass these data to be transferred with this encryption key.

For instance each integrity check may be computed on the fly by means of an algorithm using the seed and the encryption key. This algorithm may be, for instance, the GCM ("Galois Counter Mode") algorithm. But a lot of other algorithms may be used for computing the integrity check and deciphering/enciphering data in a single pass.

The control means $11_j$ is arranged for providing the encryption key and the seed to the stream ciphering means $13_j$ and for requesting data transfer and retrieving status to the secure 5 and non secure 4 modules for allowing the transfer of encrypted/decrypted data between the secure 5 and non secure 4 modules.

So one of the functions of the control means $11_j$ is to inform the secure 5 or non secure 4 module about an initiated data transfer from the non secure 4 or secure 5 module. When such an information (or notification) has been done each module 4, 5 properly programs its own DMA element 9 according to parameters provided by the control means $11_j$ (and detailed below). The starting of the two DMA elements 9 allows for a given sense of data transfer in a given logical channel.

Thanks to the invention, the secure module 5 of the system on chip 2 acts as several virtual secure elements respectively for several image owners, and therefore the secure hardware environment of the apparatus 3 can be shared by these image owners. This sharing cannot be considered as simultaneous, because only one image can be accessed at a given time and therefore one must proceed to a switch to access from an image to another one. But this switching can be very fast and therefore allows the apparatus 3 to support a quasi-simultaneity of use of images.

The stream ciphering means $13_j$ and the control means $11_j$ are preferably made of a combination of electronic circuit(s) (or hardware module(s)) and software modules. So, and as illustrated in the non-limiting example of the unique FIGURE, each of them is preferably divided in two parts referenced by index j (j=1 or 2), to ease their hardware integration into a system on chip 2. In this case, each part (j) is dedicated to data transfer in a single sense (here a first part (j=1) is dedicated to data transfer from the non secure module 4 to the secure module 5, while a second part (j=2) is dedicated to data transfer from the secure module 5 to the non secure module 4). But in a variant of embodiment each one of the stream ciphering means $13_j$ and control means $11_j$ could be a single module in charge of a part of all the data transfer between the non secure 4 and secure 5 modules in both senses.

So in the illustrated example of embodiment the first part $13_1$ of the stream ciphering means $13_j$ is arranged for computing on the fly and in a single pass an integrity check for data to be transferred from the non secure module 4 to the secure module 5, and for decrypting on the fly and in this single pass encrypted data to be transferred to the secure module 5 (and that it receives from the non secure module 4). This first part $13_1$ of the stream ciphering means $13_j$ is coupled to the DMA 9 of the secure module 5. The second part $13_2$ of the stream ciphering means $13_j$ is arranged for computing on the fly and in a single pass an integrity check for data to be transferred from the secure module 5 to the non secure module 4, and for encrypting on the fly and in this single pass the data received from the secure module 5 before transferring them to the non secure module 4. This second part $13_2$ of the stream ciphering means $13_j$ is also coupled to the DMA 9 of the secure module 5.

In the same way, the first part $11_1$ of the control means $11_j$ is arranged for providing the encryption key and the seed to the stream ciphering means $13_j$ (and more precisely to its first part $13_1$), and for requesting data transfer and retrieving status to the non secure module 4 for allowing the transfer of encrypted data from the non secure module 4 to the stream ciphering means $13_j$ (and more precisely to its first part $13_1$), and then the transfer of decrypted data from the stream ciphering means $13_j$ (and more precisely its first part $13_1$) to the secure module 5. This first part $11_1$ of the control means $11_j$ is coupled to the MMUs 7 and the CPUs 6 of the non secure 4 and secure 5 modules, and to the first part $13_1$ of the stream ciphering means $13_j$. The second part $11_2$ of the control means $11_j$ is arranged for providing the encryption key and the seed to the stream ciphering means $13_j$ (and more precisely to its second part $13_2$), and for requesting data transfer and retrieving status to the secure module 5 for allowing the transfer of data from the secure module 5 to the stream ciphering means $13_j$ (and more precisely to its second part $13_2$), and then the transfer of encrypted data from the stream ciphering means $13_j$ (and more precisely its second part $13_2$) to the non secure module 4. This second part $11_2$ of the control means $11_j$ is coupled to the MMUs 7 and the CPUs 6 of the non secure 4 and secure 5 modules, and to the second part $13_2$ of the stream ciphering means $13_j$.

Preferably, the (each part of the) control means $11_j$ is arranged for exposing on the secure module side the capability to retrieve the computed integrity check of decrypted data. So, the (each part of the) control means $11_j$ is preferably arranged for providing the computed integrity check to the secure module 5. This computed integrity check can be automatically compared with a decrypted integrity check appended at the end of a transferred data chunk. An integrity check error may generate an exception for the CPU 6 in the secure module 5.

Also preferably, the (each part of the) control means $11_j$ is arranged for providing a channel information, defining a routing of the transferred data to a given function, to the secure module 5 and the non secure module 4.

For instance, the first part $11_1$ of the control means $11_j$ may be arranged for requesting a data transfer by means of a request comprising the following parameters: a chaining bit information to perform a segmentation and reassembly of bursts of data, a channel information to perform a routing of data packets to a given function, the length of the data to transfer, the encryption key used for the encrypting/decrypting, the seed for computing the integrity check of the data to transfer, and a command for enabling the encrypting/decrypting.

Also for instance, the first part $11_1$ of the control means $11_j$ may be arranged for reading a status by sending a request comprising the following parameters: a bit informing about the acknowledge of the end of the transfer from the non secure module 4, a bit informing about the acknowledge of the end of the transfer from the secure module 5, a chaining bit information to perform a segmentation and reassembly of bursts of data, a channel information to perform a routing of data packets to a given function, the length of the data to transfer, and the integrity check computed by the first part $13_1$ of the stream ciphering means $13_j$. The above description allows the support of basic principles such as the HCP defined in the ETSI standard TS 102.622.

In the same way, the second part $11_2$ of the control means $11_j$ may be arranged for requesting a data transfer by means of a request comprising the following parameters: a chaining bit information to perform a segmentation and reassembly of bursts of data, a channel information to perform a routing of data packets to a given function, and the length of the data to transfer.

Also for instance, the second part $11_2$ of the control means $11_j$ may be arranged for reading a status by sending a request comprising the following parameters: a bit informing about the acknowledge of the end of the transfer from the secure module 5, a chaining bit information to perform a segmentation and reassembly of bursts of data, a channel information to perform a routing of data packets to a given function, and the length of the data to transfer.

To ease data transfer, the device 1 may also comprise first $12_1$ and second $12_2$ memory means as illustrated in the non-limiting example of the unique FIGURE. The first memory means $12_1$ is arranged for storing temporary chunks of encrypted data during their transfer from the stream ciphering means $13_j$ (and more precisely from its first part $13_1$) to the non secure module 4. This first memory means $12_1$, which is coupled to the DMA 9 of the non secure module 4 and to the first part $11_1$ of the control means $11_j$, is preferably of the FIFO ("First In First Out") type. The second memory means $12_2$ is arranged for storing temporary chunks of data during their transfer from the secure module 5 to the stream ciphering means $13_j$ (and more precisely to its second part $13_2$). This second memory means $12_2$, which is coupled to the DMA 9 of the non secure module 4 and to the second part $11_2$ of the control means $11_j$, is also preferably of the FIFO type.

When (a part of) the control means $11_j$ is updated it generates an interrupt signal for notifying the concerned CPU 6.

It is important to note that each initial bootstrap of the secure module 5 is based on the memory content of its OTP element 10, and more precisely on the primary boot loader (or PBL) of the secure module 5. During the manufacturing of the system on chip 2, the OTP element 10 is partially programmed, so that the secure module 5 be able to compute an ECC ("Error Correcting Code") key pair (i.e. a private key and a public key). The private key is self-programmed into the memory of the OTP element 10 and the public key is transferred, for ECC signature, to the test equipment hosting an HSM ("Hardware Secure Module"). An ECC certificate is returned to the secure module 5 and programmed into the memory of its OTP element 10.

The PBL checks the successful sealing of the OTP element 10, and then wait for a data transfer conveying a command from the non secure module 4 for loading a given requested image (chosen amongst the stored group of images belonging to the different image owners). When the PBL receives this command, it loads the last image directory from the non secure module 4, looks for the first physical page related to the requested image to load it, and then starts its execution at its virtual start address.

The non secure module 4 may be arranged for generating two administration commands: a "STOP" to cause the secure module 5 to stop properly and backup all loaded physical pages to an encrypted chunk of data to an NVM memory managed by the non secure module 4, and a "START" to ask the secure module 5 to load/initiate a given image.

Thanks to this START command, the non secure module 4 may require the loading of a given image by the secure module 5. So, for instance, a mobile phone may receive a command from a network access for performing a GSM authentication, then the non secure module 4 will stop the ongoing image and load the image related to the GSM subscription requesting this access, then an NFC ("Near Field Communication") transaction occurs, and finally the GSM image is backup and a NFC banking image is loaded for execution.

The invention offers several advantages, and notably:
  it allows a hardware host to support several sets of requirements of several image owners,
  it allows sharing the same hardware host without inducing interferences between image owners,
  it allows supporting an image owner independent certification process irrespective of the level of required security,
  it allows a hardware host to support any number of images in the limit of its material resources (and notably the NVM memory size managed by the non secure module),
  it allows a low latency for switching from an image to another one into a hardware host,
  it allows a hardware host to support a quasi-simultaneity of use of images in the limit of its switching latency,
  it allows a hardware host to support any size of image in the limit of its material resources.

The invention is not limited to the embodiments of device, system on chip and apparatus described above, only as examples, but it encompasses all alternative embodiments which may be considered by one skilled in the art within the scope of the claims hereafter.

The invention claimed is:

1. A device for managing multiple accesses to a secure module of a system on chip of an apparatus providing data-transfer interfacing between the secure module and at least one non-secure module thereby allowing said secure module to be able of acting as several virtual secure elements respectively for several image owners, comprising:
  a) a stream ciphering means having a connection to said secure module
  and said at least one non-secure module storing a group of images belonging to said several image owners, the stream ciphering means arranged for computing on the fly and in a single pass an integrity check for data to be transferred between said secure module and a non-secure module of said system on chip with a seed and an encryption key, and for encrypting/decrypting on the fly and in said single pass said data with said encryption key, and
  h) a control means for providing said encryption key and said seed to said
  stream ciphering means and for requesting data transfer and retrieving status to said secure and non-secure modules for allowing said transfer of encrypted/decrypted data between said secure and non-secure modules;
  wherein the secure module comprises a primary boot loader operable to receive a START command directing the secure module to load and initiate an indicated mace selected from the stored group of images, and a STOP command from the non-secure module via the device for managing multiple accesses to the secure module, wherein upon receiving the START command the secure module loads and initiates the indicated image and upon receiving the STOP command the secure module backs up all loaded phsical pages to an encrypted chunk of data to a non-volatile memory managed by the non-secure module.

2. The device according to claim 1, further comprising a first memory means for storing temporary chunks of encrypted data during their transfer from said stream ciphering means to said non-secure module of said system on chip, and a second memory means for storing temporary chunks of data during their transfer from said secure module of said system on chip to said stream ciphering means.

3. The device according to claim 1, wherein said control means is arranged for providing said computed integrity check to said secure module of said system on chip.

4. The device according to claim 1, wherein said control means is arranged for providing a channel information, defining a routing of said transferred data to a given function, to said secure module and said non-secure module of said system on chip.

5. The device according to claim 1, wherein said stream ciphering means comprises a first part arranged for computing on the fly an integrity check for data to be transferred from said non-secure module to said secure module of said system on chip, and for decrypting on the fly and in said single pass encrypted data to be transferred to said secure module, and a second part arranged for computing on the fly and in a single pass an integrity check for data to be transferred from said secure module to said non-secure module of said system on chip, and for encrypting said data on the fly and in said single pass before transferring them to said non secure module of said system on chip.

6. The device according to claim 1, wherein said control means comprises a first part arranged for providing said encryption key and said seed to said stream ciphering means and for requesting data transfer and retrieving status to said non-secure module for allowing said transfer of encrypted data from said non-secure module to said stream ciphering means and then the transfer of decrypted data from said stream ciphering means to said secure module, and a second part arranged for providing said encryption key and said seed to said stream ciphering means and for requesting data transfer and retrieving status to said secure module for allowing said transfer of data from said secure module to said stream ciphering means and then the transfer of encrypted data from said stream ciphering means to said non-secure module.

7. A system on chip for an apparatus enabling quasi-simultaneous image loading of multiple images using a secure module, comprising:
   a secure module;
   a non-secure module storing a group of images; and
   a device for managing multiple accesses to the secure module of a system on chip of an apparatus, comprising:
      a) a stream ciphering means arranged for computing on the fly and in a single pass an integrity check for data to be transferred between said secure module and a non-secure module of said system on chip with a seed and an encryption key, and for encrypting/decrypting on the fly and in said single pass said data with said encryption key, and
      b) a control means for providing said encryption key and said seed to said stream ciphering means and for requesting data transfer and retrieving status to said secure and non-secure modules for allowing said transfer of encrypted/decrypted data between said secure and non-secure modules and interfacing data transfer between said secure and non-secure modules;
   wherein the secure module comprises a primary boot loader operable to receive a START command directing the secure module to load and initiate an indicated image selected from the stored group of images, and a STOP command from the non-secure module via the device for managing multiple accesses to the secure module, wherein upon receiving the START command the secure module loads and initiates the indicated image and upon receiving the STOP command the secure module backs up all loaded physical pages to an encrypted chunk of data to a non-volatile memory managed by the non-secure module.

8. The system on a chip for an apparatus of claim 7 wherein the device for managing multiple accesses to a secure module, further comprises a first memory means for storing temporary chunks of encrypted data during their transfer from said stream ciphering means to said non-secure module of said system on chip, and a second memory means for storing temporary chunks of data during their transfer from said secure module of said system on chip to said stream ciphering means.

9. The system on a chip for an apparatus of claim 7 wherein said control means is arranged for providing said computed integrity check to said secure module of said system on chip.

10. The system on a chip for an apparatus of claim 7 wherein said control means is arranged for providing a channel information, defining a routing of said transferred data to a given function, to said secure module and said non-secure module of said system on chip.

11. The system on a chip for an apparatus of claim 7 wherein said stream ciphering means comprises a first part arranged for computing on the fly an integrity check for data to be transferred from said non-secure module to said secure module of said system on chip, and for decrypting on the fly and in said single pass encrypted data to be transferred to said secure module, and a second part arranged for computing on the fly and in a single pass an integrity check for data to be transferred from said secure module to said non-secure module of said system on chip, and for encrypting said data on the fly and in said single pass before transferring them to said non-secure module of said system on chip.

12. The system on a chip for an apparatus of claim 7 wherein said control means comprises a first part arranged for providing said encryption key and said seed to said stream ciphering means and for requesting data transfer and retrieving status to said non-secure module for allowing said transfer of encrypted data from said non-secure module to said stream ciphering means and then the transfer of decrypted data from said stream ciphering means to said secure module, and a second part arranged for providing said encryption key and said seed to said stream ciphering means and for requesting data transfer and retrieving status to said secure module for allowing said transfer of data from said secure module to said stream ciphering means and then the transfer of encrypted data from said stream ciphering means to said non-secure module.

13. An apparatus, comprising at least one system on chip enabling quasi-simultaneous image loading of multiple images using a secure module having:
   a secure module;
   at least one non-secure module, and
   a device for managing multiple accesses to the secure module of a system on chip of an apparatus, having
      a) a stream ciphering means arranged for computing on the fly and in a single pass an integrity check for data to be transferred between said secure module and a non-secure module of said system on chip with a seed and an encryption key, and for encrypting/decrypting on the fly and in said single pass said data with said encryption key, and
      b) a control means for providing said encryption key and said seed to said stream ciphering means and for requesting data transfer and retrieving status to said secure and non-secure modules for allowing said transfer of encrypted/decrypted data between said secure and non-secure modules and interfacing data transfer between said secure and non-secure modules;
   wherein the secure module comprises a primary boot loader operable to receive a START command directing the secure module to load and initiate an indicated image selected from the stored group of images, and a STOP command from the non-secure module via the device for managing multiple accesses to the secure module, wherein upon receiving the START command the secure module loads and initiates the indicated image and upon receiving the STOP command the secure module backs up all loaded physical pages to an encrypted chunk of data to a non-volatile memory managed by the non-secure module.

14. The apparatus of claim 13 wherein the device for managing multiple accesses to a secure module, further comprises a first memory means for storing temporary chunks of encrypted data during their transfer from said stream ciphering means to said non-secure module of said system on chip, and a second memory means for storing temporary chunks of data during their transfer from said secure module of said system on chip to said stream ciphering means.

15. The apparatus of claim 13 wherein said control means is arranged for providing said computed integrity check to said secure module of said system on chip.

16. The apparatus of claim 13 wherein said control means is arranged for providing a channel information, defining a routing of said transferred data to a given function, to said secure module and said non-secure module of said system on chip.

17. The apparatus of claim 13 wherein said stream ciphering means comprises a first part arranged for computing on the fly an integrity check for data to be transferred from said non-secure module to said secure module of said system on chip, and for decrypting on the fly and in said single pass encrypted data to be transferred to said secure module, and a second part arranged for computing on the fly and in a single pass an integrity check for data to be transferred from said secure module to said non-secure module of said system on chip, and for encrypting said data on the fly and in said single pass before transferring them to said non non-secure module of said system on chip.

18. The apparatus of claim 13 wherein said control means comprises a first part arranged for providing said encryption key and said seed to said stream ciphering means and for requesting data transfer and retrieving status to said non-secure module for allowing said transfer of encrypted data from said non-secure module to said stream ciphering means and then the transfer of decrypted data from said stream ciphering means to said secure module, and a second part arranged for providing said encryption key and said seed to said stream ciphering means and for requesting data transfer and retrieving status to said secure module for allowing said transfer of data from said secure module to said stream ciphering means and then the transfer of encrypted data from said stream ciphering means to said non-secure module.

* * * * *